United States Patent [19]

Honma et al.

[11] Patent Number: 4,651,312

[45] Date of Patent: Mar. 17, 1987

[54] PORTABLE TAPE PLAYER WITH RADIO IN LID

[75] Inventors: Hideo Honma, Chiba; Nobuyuki Sato, Tokyo, both of Japan

[73] Assignee: Sony Corporation, Tokyo, Japan

[21] Appl. No.: 643,488

[22] Filed: Aug. 23, 1984

[30] Foreign Application Priority Data

Aug. 29, 1983 [JP] Japan .......................... 58-133318[U]
Jun. 30, 1984 [JP] Japan ........................... 59-99286[U]

[51] Int. Cl.⁴ ....................... H04B 1/08; G11B 31/00; G11B 33/06
[52] U.S. Cl. ......................................... 369/10; 369/1; 369/11; 369/12; 360/137; 455/351; 343/702
[58] Field of Search ..................... 369/10, 11, 12, 1; 455/351, 344, 347; 360/137; 343/702

[56] References Cited

U.S. PATENT DOCUMENTS

| | | | |
|---|---|---|---|
| 2,740,114 | 3/1956 | Adams | 343/702 |
| 3,573,628 | 4/1971 | Joseph | 455/351 |
| 4,181,823 | 1/1980 | Delamoreaux et al. | 369/10 |
| 4,334,315 | 6/1982 | Ono et al. | 455/351 |
| 4,388,712 | 6/1983 | Timm | 369/10 |
| 4,434,509 | 2/1984 | Schrepel | 455/351 |
| 4,590,614 | 5/1986 | Erat | 343/702 |

FOREIGN PATENT DOCUMENTS 0972796 8/1975 Canada .................................. 369/10

Primary Examiner—Raymond F. Cardillo
Assistant Examiner—Hoa T. Nguyen
Attorney, Agent, or Firm—Lewis H. Eslinger; Alvin Sinderbrand

[57] ABSTRACT

A combination portable magnetic tape cassette player and multiband radio receiver in which the sensitive elements of the radio receiver are arranged within a hinged, plastic cover of the combined apparatus and the circuitry of the radio receiver is formed on a printed circuit board having an AM band antenna mounted thereto, whereby the AM receiver antenna is electromagnetically unshielded by the plastic cover and the combined tape player and radio receiver is of a size substantially equal to that of the tape player alone.

13 Claims, 7 Drawing Figures

PORTABLE TAPE PLAYER WITH RADIO IN LID

BACKGROUND OF THE INVENTION

1. Field of the Invention

This invention relates generally to a cassette tape player with a built-in radio receiver and, more specifically, to a cassette tape player with a built-in radio receiver in which the radio receiver is formed on a circuit board arranged within the cover of the tape player along with the radio antenna to receive broadcast information without interference.

2. Description of the Prior Art

There are now known miniaturized, portable tape cassette players that reproduce stereophonic music signals from a prerecorded cassette tape for listening by use of similarly miniaturized headphones. Such tape players are typically of a size that can be easily accommodated in one hand, and many are so small as to be inserted into a shirt pocket.

Following the introduction of these small cassette tape players there have been units produced that incorporate a built-in radio receiver, so that not only can the tape programs be reproduced through the headphones but also radio broadcasts, both AM and FM, can be received and listened to through the same headphone set. In such tape players incorporating a built-in radio certain components are commonly utilized, for example, the electrical source, that is, the batteries, are used in common, as are the audio amplifier and the headphone amplifier. These units are used in common by both the radio receiver part and the tape recorder part in order to maintain the overall size of the unit as small as possible. In employing such commonality of parts and the incorporation of the two functionally different musical sound sources, it is necessary that the radio receiver portion be incorporated into the tape player, since the constituent elements of the tape player are fixed in their physical relationships. This then requires that the radio receiver be separated into parts or segments and that these segments be incorporated into the various, several empty spaces available in the interior of the tape player. Because such empty spaces are at different locations around the interior of the tape player, it becomes necessary for the radio receiver to be divided into several sections or segments with the location of such segments corresponding to the vacent spaces within the interior of the tape player. It is such arrangement of the radio receiver into these various parts that results in the integrated radio receiver having a complicated electrical wiring requirement relative to a conventional, unitary radio receiver. Perhaps most importantly, when the tuner unit of the radio receiver is divided into several sections, as required for the reasons set forth above, the lead length must necessarily be increased, which results in an increase in stray capacitance between such leads, thereby increasing the possibility of unwanted oscillations in the radio receiver circuitry.

Additionally, the tape drive elements in the tape cassette player, such as the capstan, the motor casing, and the chassis located within the main body of the tape player must necessarily be made of a metallic material in order to provide the necessary mechanical strength. Quite frequently, the bar or rod antenna of the AM receiver, which may include a ferrite rod, must necessarily be located in proximity to such metallic components, with the result that the radio waves being received are obstructed and interfered with by these metallic parts on their way to the rod antenna. This antenna location situation severely reduces the sensitivity of the radio receiver. In regard to receiving FM signals, the electrical conductors connecting the earphone headset to the tape cassette player or radio receiver typically provide the desirable thirty-inch antenna length optimum for use in receiving FM radio signals.

OBJECTS AND SUMMARY OF THE INVENTION

Accordingly, it is an object of the present invention to provide a cassette tape player having a built-in radio receiver that is free of the above-noted defects inherent in the prior art.

Another object of the present invention is to provide a cassette tape player having a built-in radio receiver in which the assembly and maintenance operations of the radio receiver elements are facilitated by providing a relatively spacious mounting area and in which the tape player housing is made of metallic material to improve mechanical strength.

It is a further object of the present invention to provide a tape cassette player having a built-in radio receiver in which the rod antenna is mounted at a distant location from the metallic housing of the tape cassette player, in order to reduce obstruction by the metallic housing in receiving the broadcast radio waves.

A still further object of the present invention is to provide a tape cassette player with built-in radio receiver in which the radio receiver is arranged in a hinged cover of the tape cassette player.

According to one aspect of the present invention the radio receiver is mounted in the hinged or pivotable cover of a tape cassette player, which is typically formed of plastic material because mechanical and structural strength is not required in the lid of the tape cassette player, and the bar or rod antenna is also located in the plastic hinged cover, therefore, being as far away as possible from the necessary metallic elements of the tape cassette player, which are required in order to provide either structural strength or are required because of their electrical properties, that is, the motor drive for the tape cassette player.

The above and other objects, features, and advantages of the present invention will become apparent from the following detailed description of illustrative embodiments thereof to be read in conjunction with the accompanying drawings.

DETAILED DESCRIPTION OF PREFERRED EMBODIMENT

Figure 1:
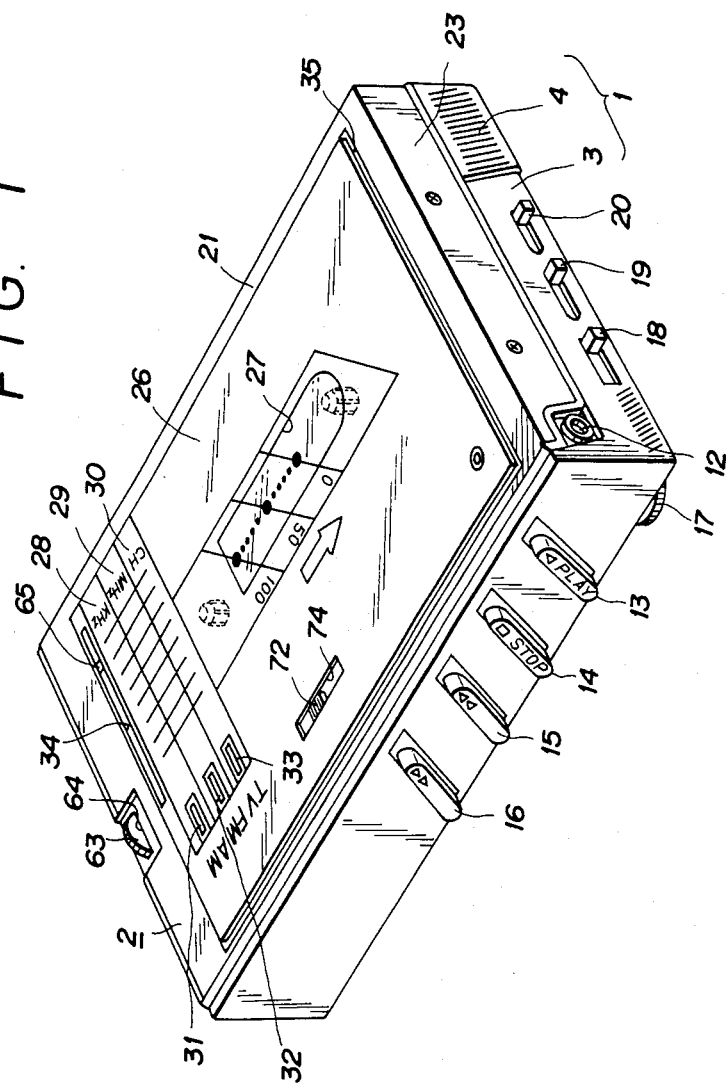
FIG. 1 is a perspective view of a tape recorder having a built-in radio according to the present invention, with no tape cassette arranged therein.
Figure 2:
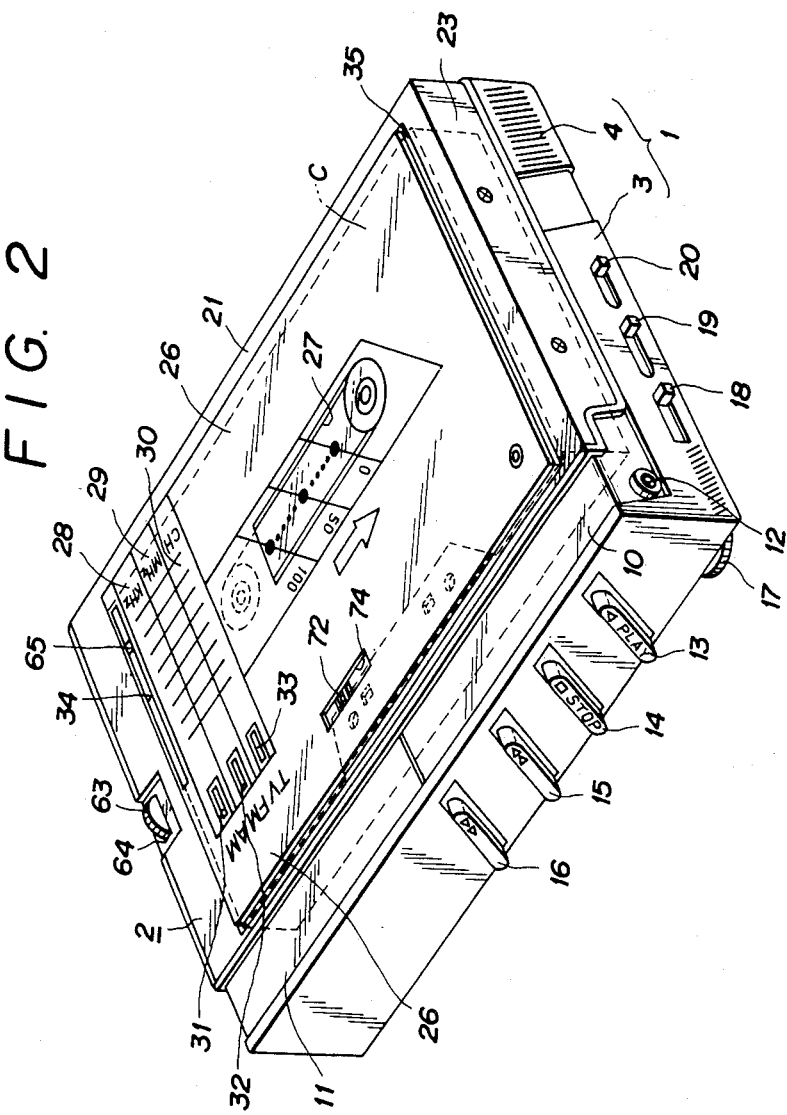
FIG. 2 is a perspective view similar to that of FIG. 1 but having a tape cassette loaded in a cassette-holding section of the tape cassette player.

FIG. 1 shows a tape cassette player having a built-in radio receiver according to the present invention and such tape player may typically have exterior dimensions of 100 mm in width, 70 mm in height, and 22 mm in thickness, when a tape cassette is not loaded therein. This particular tape cassette player is of the kind that is expanded in size in order to insert a standard size compact audio cassette. The tape player of FIG. 1 is shown without a cassette being loaded therein. The tape player has a main body 1 and a cover 2 pivotally mounted relative to the main body, so that it can be opened and closed relative thereto as desired. The main body 1 is formed of a main housing 3 and an auxiliary housing 4, both of which are formed of metallic material and the auxiliary housing is slidably movable with respect to main housing 3, in order to expand the player to receive a cassette. A tape cassette holding section 5 (FIG. 3) is defined in main body 1 so that a compact audio cassette can be mounted in place within main body 1. In order to accomplish such cassette insertion it is necessary that the auxiliary housing 4 be slidably moved in relation to main housing 3 and, upon such movement, the tape cassette player having a built-in radio receiver according to the present embodiment then becomes approximately 82 mm in height, the width and, thickness remaining the same. The mechanical arrangement whereby auxiliary housing 4 can be moved in this fashion in relation to main housing 3 so that the tape cassette can be mounted within the tape player, is described in our copending Japanese Laid-open Utility Model Publication No. 14106/1984 filed July 20, 1982. Nevertheless, a detailed description thereof is not necessary to explain the present invention.

Figure 3:
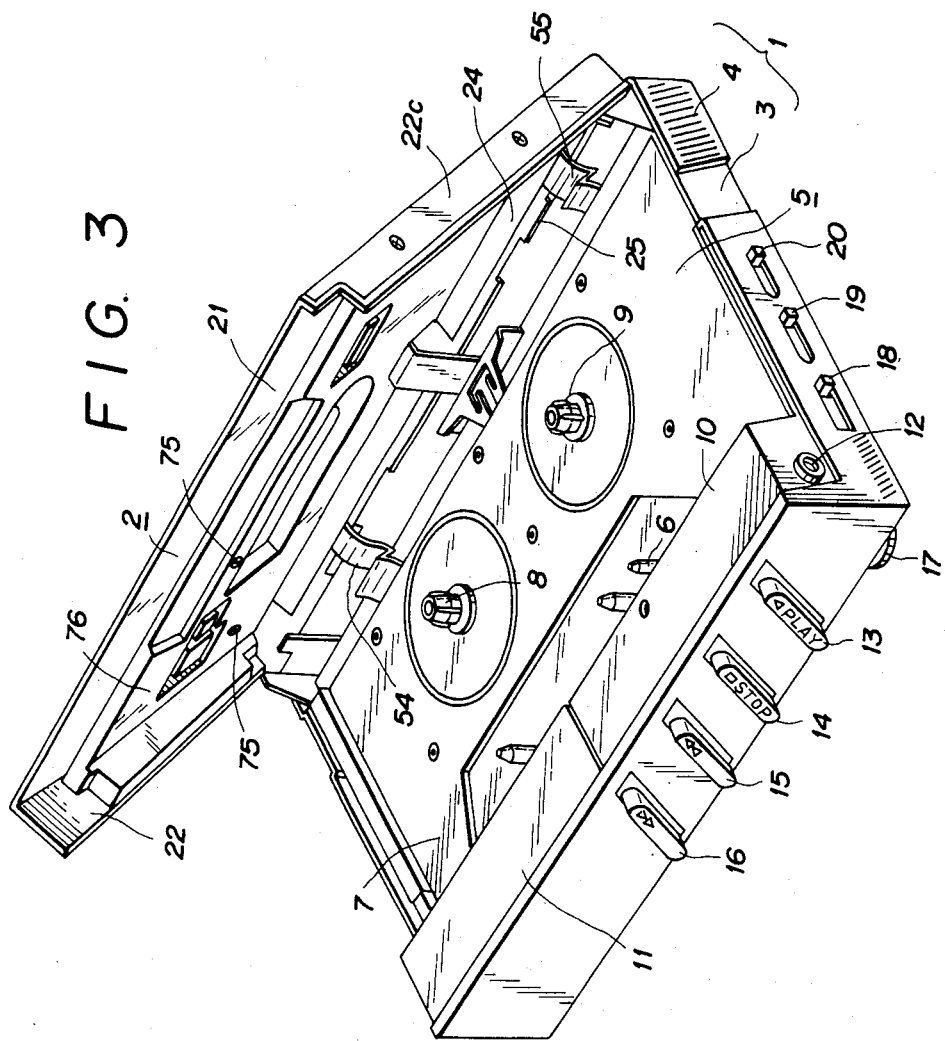
FIG. 3 is a perspective view of a tape cassette player having a built-in radio receiver in which the cassette case is opened.

Main housing 3 of main body 1 accommodates the tape recorder parts, such as the tape drive mechanism and the mode selector, and the elements that may be used in common with the radio receiver, such as the audio or headphone amplifier and the electrical power source. Thus, as seen in FIG. 3, in main housing 3 a pair of reel-driving spindles are arranged to project through a bottom plate 7 of the tape cassette mounting section 5 and engage the take-up and supply reel hubs of the tape cassette, not shown. The construction of the compact audio tape cassette is well known and has the magnetic tape arranged for transport between rotatably mounted takeup and supply reels. Tape driving spindles 8 and 9 are adapted to be selectively operated in a play mode, a fast-forward mode, and a rewind mode, in the conventional fashion by a reel-driving electric motor arranged inside main housing 3.

At one side of main housing 3 rotatable capstan shaft 6 of the tape driving mechanism projects upwardly into the tape cassette holding section 5, in the known fashion. The tape driving mechanism cooperates with a pinch roller, not shown, for clamping the magnetic tape between the capstan and pinch roller and causing the tape to travel at a constant linear speed. Capstan shaft 6 is rotatably driven by a capstan driving motor, not shown, also arranged within main housing 3. The forward portion of main housing 3 includes head housing section 10 that encloses a playback magnetic head used exclusively for contact with the magnetic tape to read the electrical signals that have been magnetically recorded on the tape. Also at one side of main body 3 is battery housing section 11 that encloses the batteries that provide the electrical power for the unit. These housing sections 10 and 11 are arranged in side-by-side longitudinal relationship at the front part of main housing 3. During the playback or reproduction mode, the magnetic head, not shown, is slidably moved forward into tape cassette holding section 5 to maintain contact with the moving magnetic tape. Headphone jack 12 is arranged in one side of head housing section 10 and into this jack the connecting plug of the headphone, not shown, or earphone is inserted.

On the outside of the front edge of main housing 3 are arranged the operational controls for the tape cassette player specifically, playback mode button 13, stop button 14, fast-forward button 15 and a rewind button 16 are arranged in mutual spaced-apart relationship along the front of the housing. Sound volume adjustment knob 17 is rotatably mounted at a lower-most edge of main housing 3. Mode changeover control 18 changes over between the tape recorder mode or the radio receiver mode and is arranged on one side of main housing 3, and a noise reduction switch 19 and a tape select operating switch 20 are mounted in juxtaposition to one another along one side of main housing 3.

Figure 4:
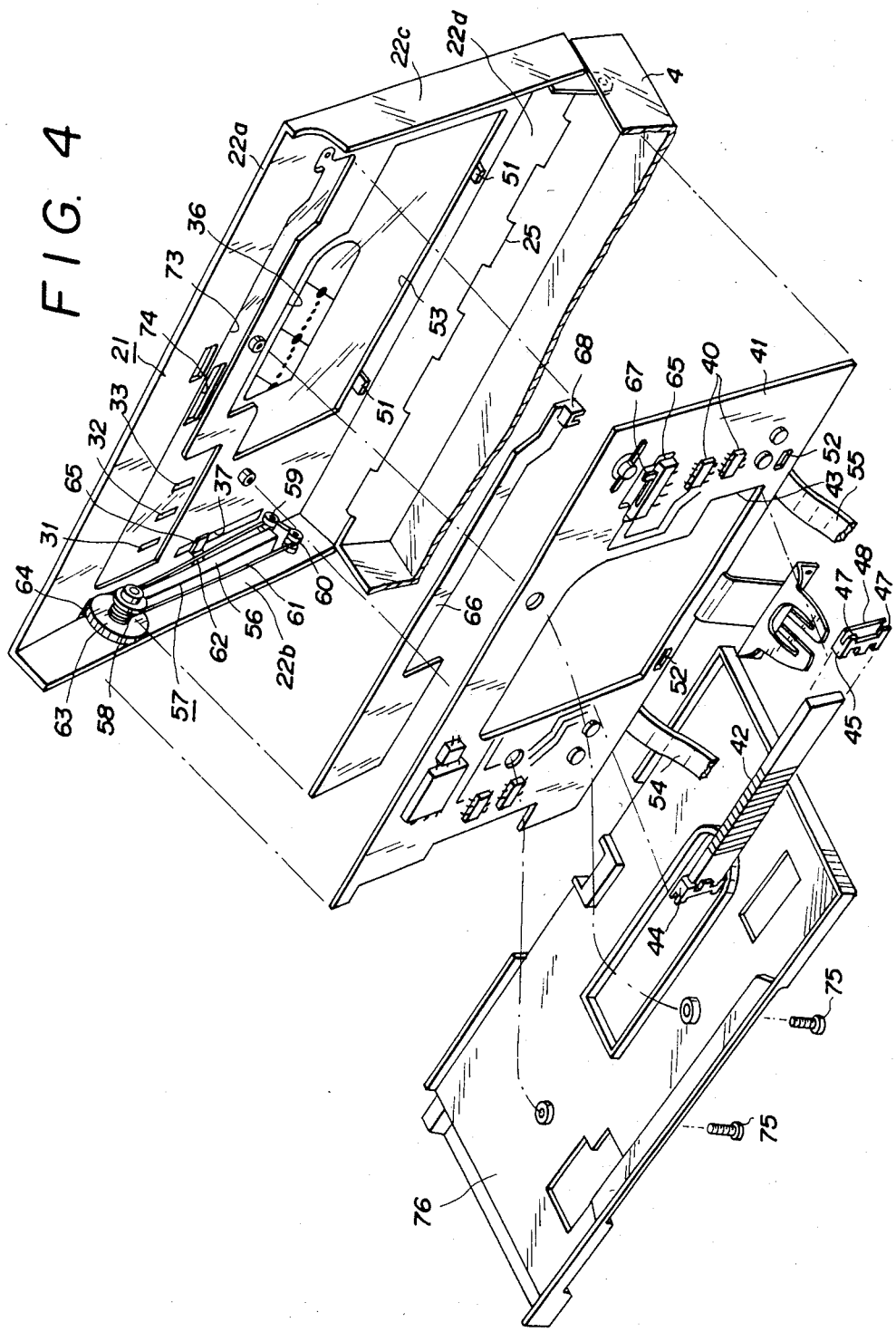
FIG. 4 is a perspective view in exploded form showing the cassette case cover of the player of FIG. 3.

In auxiliary housing 4, which is slidably arranged relative to main housing 3, cover 2 is adapted for pivotal movement to open or close tape cassette holding section 5 and is mounted by hinge 25, shown in FIG. 4. By hingedly affixing cover 2 to auxiliary slidable element 4, when auxiliary element 4 is slidably moved outwardly relative to main housing 3, cover 2 also moves, thereby providing the proper space for the tape cassette in the tape cassette holding section.

Cover 2 is comprised of cover frame 21 and panel plate 26, and cover frame 21 is integrally formed having front plate 22a, side plates 22b, 22c, and rear plate 22d, all of which are advantageously formed of synthetic resin, that is, of plastic material. Panel plate 26 formed of synthetic material is affixed to the surface of front plate 22a of cover frame 21. Display window 27 is provided and is arranged substantially central of panel plate 26, so that the amount of tape on the respective reels of the tape cassette held in holding section 5 can be visually determined without opening cover 2. As is typical in cassette players, gradations are provided on the transparent display window 27 to aid in determining the length of tape available. Arranged at one side of display window 27 are selected ones of the tuning frequencies for the radio receiver, and these may be printed directly on the plastics material. In this embodiment, three receiving bands are provided for AM frequencies 28, FM frequencies 29, and television channels 30 arranged in juxtaposition in vertical rows and suitable frequency display windows 31, 32, 33, respectively, are mounted in registry with these respective frequency gradations 28, 29, and 30. A dial indication display window 34 is arranged along one side of the frequency gradations and is provided so that an indicator can be seen to move along the length of windows 28, 29, and 30. While the various windows 27, 31, 32, 33, and 34 are transparent, the gradations 28, 29 and 30 are printed in opaque paint so that the interior elements cannot be seen from outside this embodiment of a tape cassette player with a built-in radio receiver. Panel plate 26 is located by a peripheral rib 35 formed on cover frame 21 and is affixed at the located position by a suitable adhesive.

Referring specifically to FIG. 4, cover frame 21 is formed having a cut-out 36 so that the display window 27 in panel plate 26 can permit the interior of the tape cassette holding section 5 to be visually cheoked from outside the unit without opening the cover. Similarly, cut-out 37 is formed as an enlongated through hole in registry with dial indicator display window 34 and cut-out 37 in cover frame 21 is provided to allow access from the inside to bandwidth selecting windows 31, 32, and 33.

Figure 5:
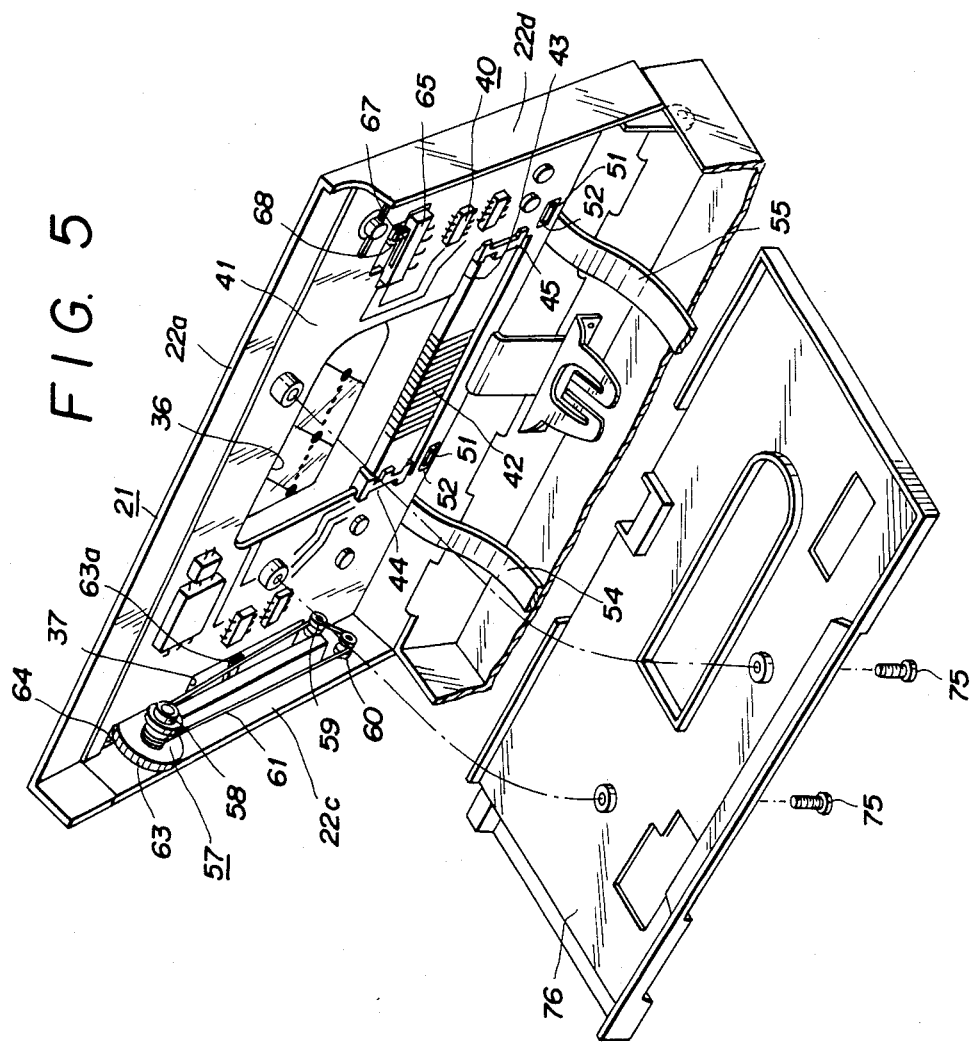
FIG. 5 is a perspective view, partially exploded, showing a printed circuit board arranged inside the cassette case cover.

On the inner surface of cover 2 is attached printed circuit board 41 for mounting and electrically connecting circuit components, typically shown at 40, which may be integrated circuit chips or similar components of the radio receiver, such as the AM and FM tuner sections, the intermediate frequency (IF) amplifier, the detector, and the FM stereo demodulator. All of these various functional circuits are easily reducible to integrated circuit component size. Located approximately at the center of printed circuit board 41 is cut-out 43 that is provided for access to mount bar or rod antenna 42, which is used to receive AM radio broadcast signals. Antenna 42 is retained on circuit board 41 by a pair of antenna holders 44 and 45, which are preferably formed of nylon or other similar plastics material, and such antenna holders are attached to printed circuit board 41 at both longitudinal ends of cut-out 43. Antenna holders 44 and 45 are adapted to hold the ends of bar antenna 41 by being formed having integral clamping elements 47 and 48 that simultaneously clamp onto the printed circuit board 41 through the spreading action caused by inserting the ends of antenna 42 into the respective ends of the antenna holders 44 and 45. In this fashion, bar antenna 42 is attached to printed circuit board 41 so as to be arranged within cut-out 43, thereby taking advantage of a space corresponding to the thickness of printed circuit board 42 and, thus, it is not necessary to provide an enlarged mounting space to accommodate antenna 41, and the thickness of the tape player and radio receiver combination of the present invention is not increased. FIG. 5 shows bar antenna 41 as it would be installed in cut-out 43 of printed circuit board 41.

Figure 6:
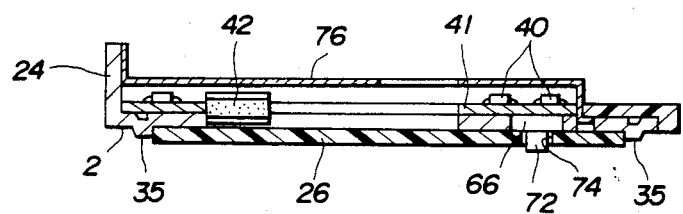
FIG. 6 is a cross-sectional view of the cassette case cover of FIG. 5.

Printed circuit board 41, to which bar antenna 42 is mounted by using mounting brackets 44 and 45 in the above-described manner, has opening 52 formed therein that is engaged by positioning lugs 51 that are formed integrally with the cassette cover 2. Printed circuit board 41 is further retained by use of an adhesive, such as double-backed tape, to the inner surface of face plate 22 of cover frame 21 on the surface thereof that is not covered with circuit components. Such mounting of circuit board 42 is shown in FIGS. 5 and 6. Cut-out 53 is formed in face plate 22a of frame 21 to accommodate bar antenna 42, and this cut-out 53 is contiguous and integrally formed with cut-out 36 in registry with display window 27 so as to provide adequate clearance space for bar antenna 42. The various circuit components, typically shown at 40, of the multi-band radio receiver circuitry are arranged on printed circuit board 41, which is mounted to cassette cover 2, and are electrically connected by flexible cables 54 and 55 mounted across hinge 25 to the electrical power source, not shown, which is utilized in common with the tape recorder elements that are arranged inside main body 1. Circuit board 41 is also electrically connected by flexible or ribbon cables 54 and 55 to the audio amplifier and headphone amplifier typically located in main body 3 of the apparatus.

Apparatus is provided to tune or select the desired frequency of the various bands provided in the radio receiver portion of the system, and a tuning assembly, shown generally at 57, is arranged and mounted to the inner surface of side wall 22 of cover frame 21. Tuning unit 57 includes variable resistance element 56 used for changing the voltage on a variable capacitance element, that is, a varicap, not shown, which serves to alter the tuning capacity of the receiving circuit. Also included in tuning unit 57 are pulleys 58, 59, and 60 and tuning knob 63, a portion of which is exposed through a cut-out in top cover 21, so that knob 63 is available for manual actuation to tune the receiver to the desired station. The resistance of variable resistor 56 is varied by manually turning knob 63, and a dial indicator 65 that is attached to dial string 62 is movable in relation to display window 34 to indicate the tuned frequency by means of gradations 28, 29, and 30 which are at the various windows associated with the respective receiving bands.

Figure 7:
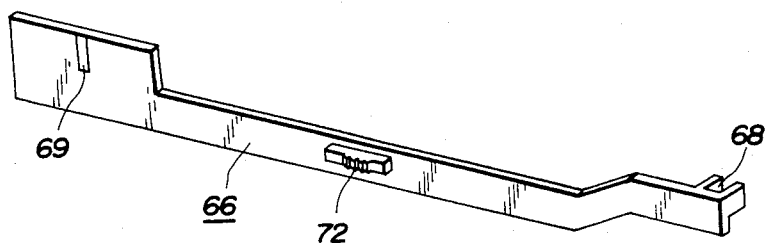
FIG. 7 is a perspective view of an operating lever for switching to the desired band in the radio receiver of FIG. 1.

Arranged between cover 2 and printed circuit board 41 is elongated, flattened, operating lever 66 formed of nonmetallic material, such as synthetic resin, and lever 66 is slidably mounted to operate bandwidth change-over switch 65, which is physically and electrically mounted on printed circuit board 41. The mounting arrangement of enlongated lever 66, printed circuit board 41, and change-over switch 65 is shown in FIG. 4. One end of enlongated lever 66 is formed having a downwardly recessed engaging boss 68, which engages slidable element 67 of band change-over switch 65. The other end of enlongated lever 66 is formed having increased width and has printed thereon display mark 69, which is so arranged as to be in juxtaposition with one of bandwidth switching display windows 31, 32, and 33, depending upon the sliding location of enlongated lever 66. Enlongated, flattened lever 66 also has a centrally arranged, upraised operating knob or boss 72 for manual actuation by the operator and enlongated, operating lever 66 is shown by itself in FIG. 7. Operating lever 66 is so positioned that engaging boss 66 at one end engages operating projection tab 67 of band change-over switch 65, so that display mark 69 at the other end is in registry with one of the band selection display widows 31, 32, and 33. The operating control knob 72 is disposed within a enlongated slot 73 formed in frame 21 and is clamped between panel plate 26 and printed circuit board 41, whereby operating knob 72 projects slightly above the surface of cassette case cover 2 through another enlongated slot 74 formed therein. By mounting enlongated lever 66 in this fashion in the sliding slot 74, it may be operated by laterally shifting the operating knob 72 to operate the band change-over switch 65 and to also bring display mark 69 into registry with one of display windows 31, 32, and 33, corresponding to the selected band, AM, FM, or TV, respectively.

Once again, by providing the above-described construction the overall thickness of the combination tape recorder and radio receiver is maintained at a minimum. More specifically, because the band selection display is comprised of plate-like operating lever 66 of minimum thickness, which is received in slide groove 73 formed by partially cutting through cassette case cover 2, case cover 2 is thereby not increased in thickness. Additionally, power consumption is again maintained at a minimum because no electrical display elements are required to indicate the selected receiving band.

In the inventive construction, printed circuit board 41 and tuning unit 57 are integrally mounted inside cover 2 and additionally are covered by cover plate 76 formed of a nonmetallic synthetic material that is affixed to cassette case cover 2 by means of screws, shown typically at 75. In this fashion, the electrical circuit components mounted on the printed circuit board 41 are protected against both electrical shorts and also inadvertent or accidental contact by the user.

As may be seen from the above and the drawings associated therewith, the present invention provides a tape recorder having a built-in radio receiver in which radio receiver circuitry 40 is mounted on printed circuit board 41, which is arranged inside and affixed to the inner surface of cassette case cover 2 at locations where there are no components required by the tape recorder, so that printed circuit board 41 is mounted over the entire inner surface of cover 2. Accordingly, this provides a relatively large area for the radio receiver components, consisting of the generally shown integrated circuit chips 40, so that all of them can be attached to the single printed circuit board 41, whereby the thickness of the radio receiver portion of the system is reduced. Additionally, assembly time is reduced since the assembly operations are facilitated because the radio receiver circuit components can be mounted on the generally spacious printed circuit board 41. Additionally, the tuning frequency gradations are formed in proximity to tuning dial 23 on cover 2, so that while the tuning operation is being performed the receiving frequency can be checked quite easily.

By attaching circuit board 41 to cassette case cover 2 it is possible to provide additional mechanical strength so that the cassette case cover 2 can be formed as a thin plate of synthetic or plastic material. This means that again the overall thickness can be maintained at a minimum yet no sacrifice in mechanical strength or physical and structural characteristics is made because the printed circuit board stacked with case cover 2 provides a relatively rigid structure so that can be positively closed without risk of being flexed or deformed. Also, by providing the radio receiver elements on a circuit board separate from the main body of the tape recorder not only is assembly facilitated but also removal for maintenance is facilitated.

Perhaps most importantly, because the bar antenna 42 for AM radio reception is attached to the plastic case cover 2 by locating it in printed circuit board 41, the antenna is not surrounded by metallic parts so that its receiving sensitivity is not lowered.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A combination portable cassette tape player and built-in radio receiver, comprising:
   a main body in the form of a rectangular parallelepiped;
   means for arranging a cassette tape player within said main body;
   a cover element hingedly attached to said main body having a height substantially less than a height of said main body and cooperating with said main body and said tape player to form a cassette tape holding section for receiving a cassette tape therein; and
   means for arranging a radio receiver within said cover element, said ratio receiver including a printed circuit board having a substantially centrally arranged cut-out porition and an antenna element and further comprising means for mounting said antenna element substantially within said centrally arranged cut-out portion that is mounted within said cover element.

2. A combination portable cassette tape player and built-in radio receiver according to claim 1, in which said radio receiver further includes at least a tuner, an intermediate frequency amplifier, and a detector and said means for arranging said radio receiver includes means for arranging said tuner, said intermediate frequency amplifier, and said detector in said cover element and in which said tape player arranged within said main body includes at least an audio amplifier and an electrical power source and further comprising connection means whereby said audio amplifier and said electrical power source are employed in common by said tape player and said radio receiver.

3. A combination portable cassette tape player and built-in radio receiver according to claim 2, in which said tuner, said intermediate frequency amplifier, and said detector included in said radio receiver are mounted on said printed circuit board.

4. A combination portable cassette tape player and built-in radio receiver according to claim 1, in which said main body comprises a housing formed of metallic material and said cover comprises a housing formed of plastic material having said antenna element arranged therein, whereby said antenna is unshielded from electro-magnetic radiation.

5. A combination portable cassette tape player and built-in radio receiver according to claim 4, in which said radio receiver is of a kind for receiving more than one broadcast band and further comprising a band selector switch mounted on said printed circuit board arranged within said cover element and a band selector operating lever slidably mounted on said cover element and operably connected with said band selector switch.

6. A combination portable cassette tape player and built-in radio receiver according to claim 5, in which said band selector operating lever comprises a flattened, enlongated blade element slidably arranged between said cover element and said printed circuit board.

7. A combination portable cassette tape player and built-in radio receiver according to claim 6, in which said antenna element is formed as a bar and in which said means for mounting said antenna includes at least two clip elements for attaching the ends of said antenna element in said cut-out portion of said printed circuit board.

8. Portable magnetic tape cassette player apparatus of the kind for use with an earphone, comprising:
   a box-shaped main body arranged to contain said magnetic tape player;
   a cover having a height less than a height of said main body and being hingedly attached along one edge thereof to said main body, thereby forming a cassette tape holding section for receiving a cassette tape therein; and
   a multiband radio receiver arranged within said hingedly mounted cover and including at least a printed circuit board, AM band receiving circuitry, and an AM bar antenna for receiving AM band radio broadcasts, said printed circuit board being arranged within said hingedly mounted cover and having said AM band receiving circuitry mounted thereon and having a substantially centrally arranged cut-out section with said AM bar antenna mounted within said cut-out section, wherein signals received by said radio receiver are reproduced through said earphone.

9. Apparatus according to claim 8, in which said radio receiver further comprises FM band receiving circuitry and in which said earphone includes an electrical conductor connected to said multiband radio receiver, said electrical conductor comprising an antenna for FM band radio broadcasts.

10. Apparatus according to claim 8, in which said main body includes a metal case and said cover includes a plastic case, whereby said AM bar antenna mounted in said cover is substantially unshielded from electro-magnetic radiation.

11. Apparatus according to claim 10, further comprising a band selector switch for selecting a broadcast band of said radio receiver, said band selector switch being mounted on said printed circuit board arranged within said cover and a band selector operating lever slidably mounted on said cover and operably connected with said band selector switch.

12. Apparatus according to claim 11, in which said band selector operating lever comprises a flattened, enlongated blade element slidably arranged between said cover and said printed circuit board.

13. Apparatus according to claim 12, further comprising at least two mounting elements for mounting said AM bar antenna in respective ends of said cut-out portion of said printed circuit board.

* * * * *